April 7, 1953

M. KNOBEL 2,634,081

WEIGHING MACHINE

Filed Oct. 29, 1948

INVENTOR.
Max Knobel
BY
J. Stanley Churchill
ATTORNEY

April 7, 1953

M. KNOBEL

2,634,081

WEIGHING MACHINE

Filed Oct. 29, 1948

INVENTOR.
Max Knobel
BY
J. Stanley Churchill
ATTORNEY

April 7, 1953  M. KNOBEL  2,634,081
WEIGHING MACHINE
Filed Oct. 29, 1948  3 Sheets-Sheet 3

INVENTOR.
Max Knobel
BY J. Stanley Churchill
ATTORNEY

Patented Apr. 7, 1953

2,634,081

UNITED STATES PATENT OFFICE 2,634,081

WEIGHING MACHINE

Max Knobel, Arlington, Mass., assignor to Pneumatic Scale Corporation, Limited, Quincy, Mass., a corporation of Massachusetts Application October 29, 1948, Serial No. 57,149

16 Claims. (Cl. 249—48)

This invention relates to a weighing machine.

One object of the invention is to provide a novel and improved weighing machine which is capable of performing the weighing operation upon minute movement of the weighing element and which is also characterized by the embodiment of a novel and improved construction of the weighing element.

A further object of the invention is to provide a novel and superior weighing machine in which flowable solid material to be weighed is fed in a bulk and in a drip stream upon the weighing element, and provision is made preferably through a pneumatically operated control mechanism for terminating in succession the operation of the bulk and drip streams during movement of the weighing element into successive positions and through a distance of a few thousandths of an inch.

A still further object of the invention is to provide a novel weighing machine for weighing flowable solid material embodying a novel weighing element characterized by a relatively high natural frequency of vibration and in which provision is made for damping the vibrations to enable the time required for deflection of the beam into a position to perform the weighing to approximate the period of one oscillation of the beam.

With these general objects in view, and such others as may hereinafter appear, the invention consists in the weighing machine, and in the various structures, arrangements and combinations of parts hereinafter described and particularly defined in the claims at the end of this specification.

In the drawings illustrating the preferred embodiment of the invention, Fig. 1 is a side elevation of a weighing machine embodying the present invention; Fig. 8 is a wiring diagram to be referred to.

In general, the present invention contemplates a weighing machine embodying a weighing element and material feeding means for feeding the flowable solid material upon the weighing element, together with novel pneumatically operated control mechanism for controlling the material feeding operation. The pneumatically operated control mechanism includes a conduit through which air under substantial pressure may be caused to flow to be discharged through a small discharge orifice. The conduit is provided with a restricted throat portion spaced in advance of the discharge orifice arranged to offer a substantial resistance to the flow of air therethrough, and the control mechanism is further provided with means movable with the weighing element and in effect constituting a valve for opening and closing the discharge orifice. With this arrangement, upon minute movement of the weighing element the valve operates to open the discharge orifice a minute amount, such for example as .001 of an inch, thereby effecting a substantial pressure change in the portion of the conduit between the discharge orifice and the throat, and provision is made for controlling the material feeding operation by the pressure change.

In the preferred and illustrated embodiment of the invention the aforesaid pneumatically operated control mechanism is used in controlling the feeding of the bulk load onto the weighing element, and provision is made for controlling the drip stream by novel control mechanism actuated when the scale beam in its movement has been moved into a predetermined position. Provision is also preferably made for enabling adjustment to be made of the points in the movement of the scale beam at which both the bulk and drip streams may be cut off.

In the operation of prior commercial automatic weighing machines a stream of material is fed onto the weighing end of a counter-weighted scale beam and when a predetermined weight is reached, provision is made through control mechanism actuated by movement of the scale beam for cutting off the stream of material. One of the major time-consuming factors in the operation of such automatic weighing machines having control mechanism actuated by the movement of a counter-weighted scale beam, is the time required for the scale beam to move from a position at rest to an unbalanced position through a distance sufficient to actuate the control mechanism after the predetermined weight has been delivered to the weighing end of the scale beam. During this time interval the stream of material continues to flow onto the scale beam and in practice, the scale beam counterweight is manually adjusted by trial in an attempt to compensate for the amount of material added to the load during this time interval, the degree of accuracy of the final load being thus dependent upon the uniformity of the stream being fed. As is well known, non-freely flowable materials cause wide variations in the weights obtainable.

The present weighing machine preferably embodies a novel weighing element comprising in effect a rigid beam suspended upon a thin spring steel strip constituting a flexible fulcrum and which is heavily spring loaded to form a spring balance system. The weights of the beam and the springs are preferably designed so that this spring balance system has a relatively high natural frequency of vibration, preferably of the order of from five to fifteen cycles per second. Provision is preferably made for damping the vibrations to an extent such that the beam deflects from its initial to its final position with essentially no additional oscillations, and consequently the time required for the beam to change its deflection from one position to another to actuate the material feed control mechanism approximates the period of one oscillation. In other words, such time is of the order of from $\frac{1}{5}$ to $\frac{1}{15}$ of a second or less. This particular type of weighing element lends itself particularly to use with the pneumatic control mechanism capable of actuating control mechanisms upon minute beam movement so that an extremely rapid and accurate weighing operation may be accomplished.

Referring now to the drawings, the invention is herein illustrated as embodied in an automatic net weight weighing machine of the type illustrated and described in the United States patent to S. R. Howard, No. 2,364,902, issued December 12, 1944, adapted to permit two weighing operations to be performed during each cycle of operation, first a primary or bulk load weighing operation, and then a final or drip load weighing operation. As herein shown, the illustrated machine comprises a storage hopper 10 for the bulk supply of the material to be weighed and from which the material flows by gravity into an individual material feeding hopper, indicated generally at 12. The material feeding hopper 12 is provided with a rotary drum 14 by which the material is fed through the hopper to be received by a receptacle 16 disposed upon the weighing end of a scale beam indicated generally at 18. In the operation of the machine when the receptacle 16 has received its final load it is arranged to be opened to release its material which is then permitted to flow through a funnel or guide chute 20 into a carton 22 disposed therebeneath. The cartons are supported upon a conveyor belt 24 which is arranged to convey the cartons from a supply thereof into a position beneath the funnel 20 to receive the material, as illustrated in the Howard patent above referred to.

Figures 1, 8:
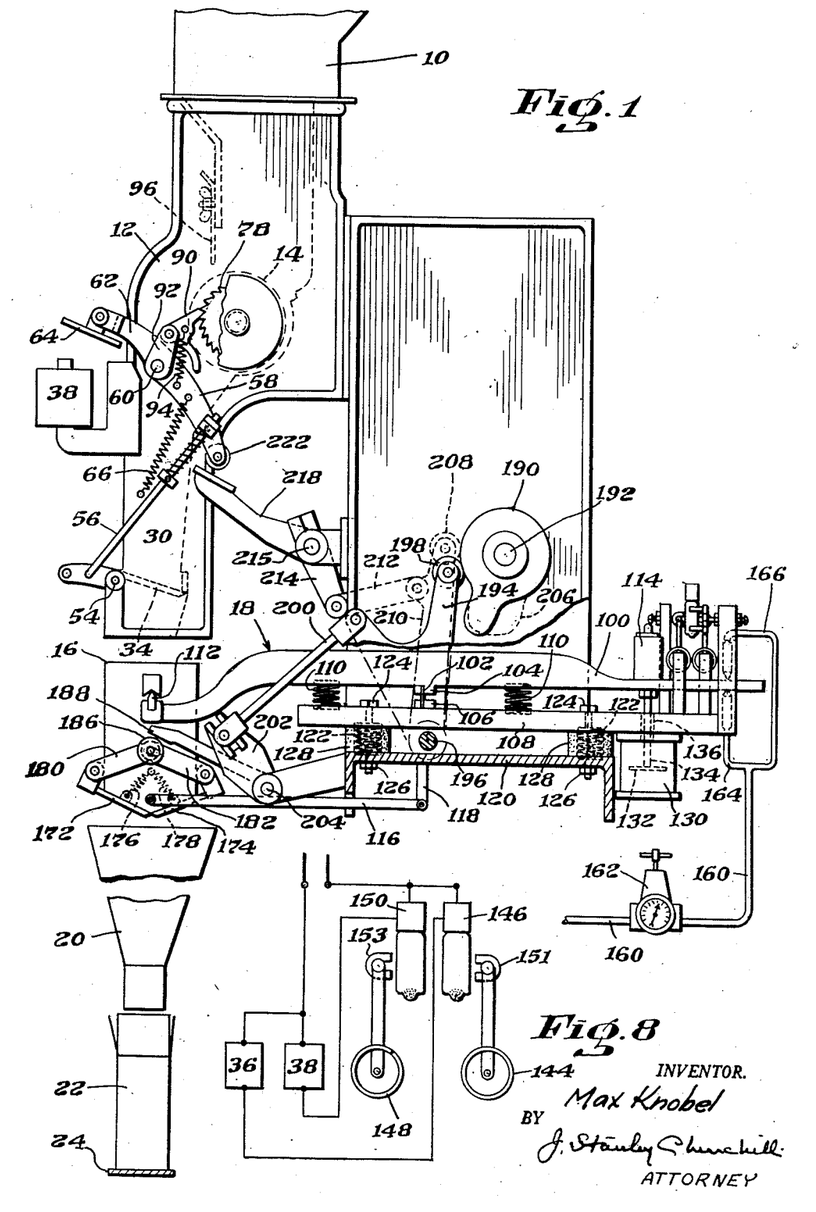
Figures 2, 3, 4, 7:
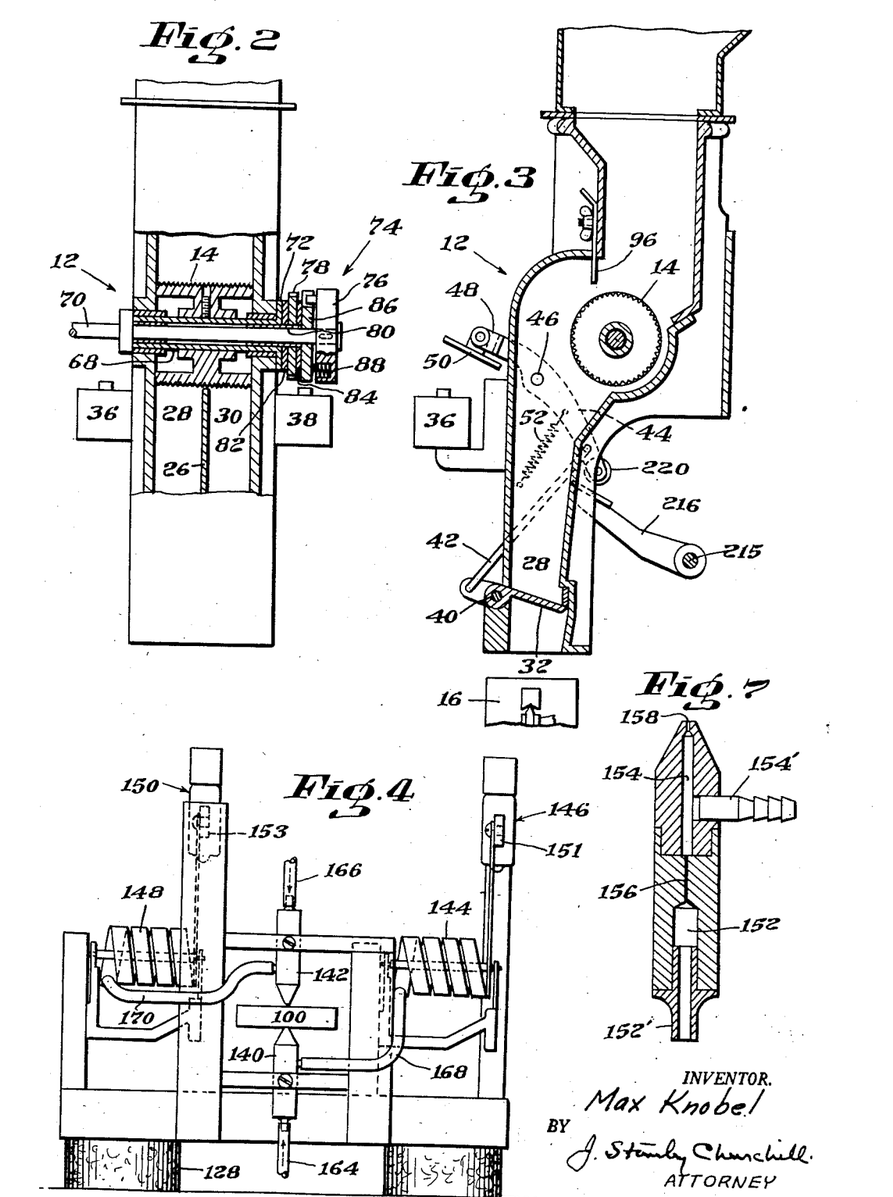
Fig. 2 is a front elevation partly in cross-section of the material feeding mechanism shown in Fig. 1.
Fig. 3 is a vertical cross-section of the material feeding hopper shown in Fig. 1.
Fig. 4 is an end view of control mechanism as viewed from the right in Fig. 1.
Fig. 7 is an enlarged detail view in cross-section of an air jet forming a part of the control mechanism.

Referring now to Figs. 2 and 3, the material feeding hopper 12 is divided longitudinally by a partitioning member 26 to provide two passageways 28, 30 through which the material passes to be delivered into the receptacle 16. Each passageway is provided with its individual gate 32, 34 both of which are arranged to be opened to permit material to be fed to the scale receptacle 16 at the beginning of each cycle of operation. During the weighing operation each gate is arranged to be closed independently of the other, one gate being closed at the end of the primary or bulk load weighing period and the other gate being closed at the end of the final or drip load weighing period. The gates 32, 34 are held in their open position during the weighing operation through connections to electro-magnets 36, 38 forming part of a circuit diagrammatically illustrated in Fig. 8. The circuit is arranged to be broken through control mechanism, to be hereinafter described, when the scale beam is moved by the weight of the material in the receptacle during the primary or bulk weighing period to de-energize the electro-magnet 36 whereupon the gate 32 is automatically closed. Thereupon, during the continued flow of the drip stream, the scale beam is caused to continue its movement until the final weight is reached whereupon the circuit is broken to de-energize the electro-magnet 38 at the end of the weighing cycle to close the gate 34.

As illustrated in Fig. 3, the gate 32 which is arranged to close the passageway 28, is pivotally mounted at 40 in the hopper frame and is connected by a link 42 to one arm 44 of a two-armed lever rockingly mounted on a stud 46 secured to the hopper. The second arm 48 of the two-armed lever is provided with an armature 50 of the electro-magnet 36. The electro-magnet 36 when energized operates to hold the gate 32 in its open position, and when de-energized, the gate is closed by a spring 52.

Referring now to Fig. 1, the gate 34 which is arranged to close the adjacent passageway 30 is similarly mounted on a pin 54 and is connected by a link 56 to one arm 58 of a two-armed lever pivotally mounted on a stud 60. The second arm 62 of the two-armed lever is provided with a similar armature 64 adapted to engage its electro-magnet 38 when the latter is energized to hold the gate 34 open. A similar spring 66 tends to close the gate 34 when the electro-magnet is de-energized.

Provision is made for rotating the feed drum 14 continuously during the entire weighing operation and for stopping the movement of the drum at the end of the drip feed weighing period. As herein shown, see Figs. 1 and 2, the feed drum 14 is fixed to an elongated sleeve 68 loosely mounted on a continuously rotated shaft 70, the latter being arranged to be rotated through drive mechanism illustrated and described in the Howard Patent No. 2,364,902 to which reference may be had. The elongated sleeve 68 is provided with a flanged end 72 and the drum is arranged to be driven through pressure exerted against the flange 72 by a yieldingly engaged friction clutch, indicated generally at 74, the driving member 76 of the clutch being keyed to the shaft 70. A ratchet 78 loosely mounted on a bushing 80 is engaged between friction members 82, 84 arranged to be compressed by the driven member 86, the latter being urged against the ratchet and friction members by springs 88 to effect rotation of the drum 14. As illustrated in Fig. 1, a pivotally mounted pawl 90 carried by an extension 92 of the two-armed lever 58, 62 is arranged to engage the ratchet 78 to stop the drum at the end of the final weighing operation. The pawl 90 is held in engagement with its ratchet by a spring 94. When the two-armed lever is reset to be held by the electro-magnet 38 at the beginning of a new cycle of operation, as will be described, the pawl 90 is rocked beyond the path of the ratchet 78 and the drum 14 is permitted to rotate to feed the material through the hopper.

It will be observed that the drum 14 feeds material continuously into both passageways 28, 30 during the entire weighing operation and that when the gate 32 is closed the material being fed into the passageway 28, during the final weighing operation, is permitted to accumulate therein so as to form a bulk load to be released into the scale receptacle 16 at the beginning of the succeeding weighing operation.

From the description thus far it will be observed that the feed drum 14 is arranged to be continuously driven during the weighing cycle to feed material from the supply hopper 10 through the compartments 28, 30 of the feed hopper 12 and that the gates 32, 34 of the hopper are arranged to be independently operated to permit one gate to be closed when a predetermined bulk load has been deposited into the weighing receptacle and to permit closing of the second gate when the final load has been introduced into the weighing bucket 16. As illustrated in Fig. 1, an adjustable gate 98 is provided above the feed drum 14 in order to control the amount of material being withdrawn from the supply hopper.

Referring now particularly to Fig. 1, the scale beam generally indicated at 18, comprises in effect a spring loaded balance system particularly designed to perform the weighing operation in a fast and accurate manner and, as herein shown, comprises a rigid beam member 100 provided with a flexible fulcrum comprising a strip of thin spring steel 102 disposed at right angles to the beam and connected between a lug 104 depending from the mid-portion of the beam and a lug 106 upwardly extended from a base member 108. A pair of compression springs 110 disposed substantially equidistantly on either side of the flexible fulcrum is interposed between the base member and the underside of the beam 100, the springs 110 being retained in suitable sockets and initially compressed to provide considerable tension in the steel strip 102 thus forming a spring loaded resonant balance system having a relatively high frequency of vibration preferably approximately in the order of five to fifteen cycles per second so that the deflection of the beam when a weight is added to one end thereof is relatively small to provide a relatively rapid action during the weighing operation.

In other words, in the selection of the springs 110 consideration is given to the weight of the movable members of the weighing element including the scale beam 18 and the weighing receptacle 16 together with the weight of the load to be weighed so as to impart to the resonant balance system a natural frequency of vibration within the aforesaid range of about 5 to 15 cycles per second. The preloaded spring means may have a deflection value lying between the limits of .030 and .002 of an inch at the load receiving end of the weighing element when a test weight of one ounce in excess of the preloading is placed on the load receiving means, and preferably a deflection value lying between the limits of .010 and .002 of an inch. The above deflection values necessarily follow from a consideration of the mathematical relationship expressed by the standard and well-known formula:

$$\frac{F}{y} = 4\pi^2 n^2 m$$

In the formula F is the force which will cause a deflection $y$ when the mass $m$ is being vibrated at a frequency of $n$.

As illustrative of operative examples of weighing machines embodying the principles of the invention, the preloading of the beam is such that one ounce in excess of the preloading produces .002 of an inch deflection. F must be in pounds, hence is $\frac{1}{16}$ and $y$ must be in feet, hence $$\frac{.002}{12} = .000166 \text{ lbs./ft.}$$

Substituting these values in the formula:

$$\frac{F}{y} = \frac{1/16}{.000166} = 375$$

In weighing machines of the general type disclosed herein, the weighing element is designed to handle loads of from a fraction of a pound up to five pounds, for example, these being the usual weights of the materials put in commercial packages at the present time. In a weighing machine embodying the invention the receptacle and its structure weighs in the neighborhood of 1½ pounds, and the mass $m$ at the time of completing the weighing will be 1½ plus the weight of the material being weighed.

In weighing ¼ lb., total weight equals 1¾ lbs.
In weighing 1 lb., total weight equals 2½ lbs.
In weighing 5 lbs., total weight equals 6½ lbs.

Substituting these values in the above formula the following results are obtained:

for ¼ lb.

$$\frac{F}{y} = 375 = 4\pi^2 n^2 \frac{1¾}{32.2}$$

$n = 13.1$ cycles per second for 1 lb.

$$375 = 4\pi^2 n^2 \frac{2½}{32.2}$$

$n = 10.9$ cycles per second for 5 lbs.

$$375 = 4\pi^2 n^2 \frac{6½}{32.2}$$

$n = 6.8$ cycles per second

It will be observed that with the deflection of .002 inch per ounce the frequencies vary from 13.1 cycles per second for a ¼ pound load to 10.9 cycles per second for a 1-pound load to 6.8 cycles per second for a 5-pound load and all of these frequencies fall within the range of from five to fifteen cycles per second disclosed herein.

As herein shown, the beam member 100 is provided with the receptacle 16 supported on knife edges 112 at the weighing end of the beam and is provided with the usual counter-weight 114 at the other end of the beam. The receptacle is maintained in a vertical position by a parallel link 116 connected between the lower end of the receptacle and an arm 118 depending from the underside of the platen 120. In order to prevent the vibrations set up in the frame of the weighing machine from affecting the action of the resonant balance system, the spring loaded scale beam unit 18 may be supported from the platen 120 on compression springs 122 interposed between the platen and the underside of the base member, the springs being maintained in their compressed condition by bolts 124 and nuts 126 connecting the base member to the platen, as illustrated. A felt spacing collar 128 surrounding each spring 122 and also interposed and compressed between the platen and the base member further assists in damping the vibrations from the machine frame.

In order to damp and prevent premature and undesirable vibratory oscillations of the beam 100 during the weighing operation a dashpot 130 is provided having a loose fitting piston 132 moving in oil, the piston being rigidly connected by a rod 134 to the counter-weight end of the beam 100. The dashpot 130 is secured to the underside of the base member 108 and the rod 134 extends through an opening 136 in the base member with clearance to permit freedom of movement of the rod. The dashpot is preferably so proportioned that the degree of damping effected is such as to permit deflection of the beam 100 from its initial to its final position during the weighing operation without any additional oscillations. In other words, the effective damping is so correlated with respect to the resonant beam system that the time for the beam to be deflected from one position to another is approximately equal to the period of one oscillation, in the present instance being of the order of one-tenth to one-fifteenth of a second. With this construction, it will be seen that in operation, the back or counter-weight end of the scale beam 100 is initially urged downwardly by the counter-weight 114, the end of the scale beam preferably resting against a suitable stop, as will be described, and as material is introduced into the scale receptacle 16, the spring-loaded beam will not be deflected until such time as the weight of the material overcomes the counter-weight 114 and the preset spring tension. When the predetermined weight is reached the counter-weight end of the scale beam will be deflected upwardly with a uniform motion without undesired oscillations and provision is made for effecting termination of the material feed upon movement of the beam through a distance of a few thousandths of an inch. In the illustrated weighing machine provision is preferably made for effecting the termination of the bulk stream flow immediately after the beam has moved one or two thousandths of an inch and for thereafter terminating the drip stream after the scale has moved another one or two thousandths of an inch.

Figure 5:
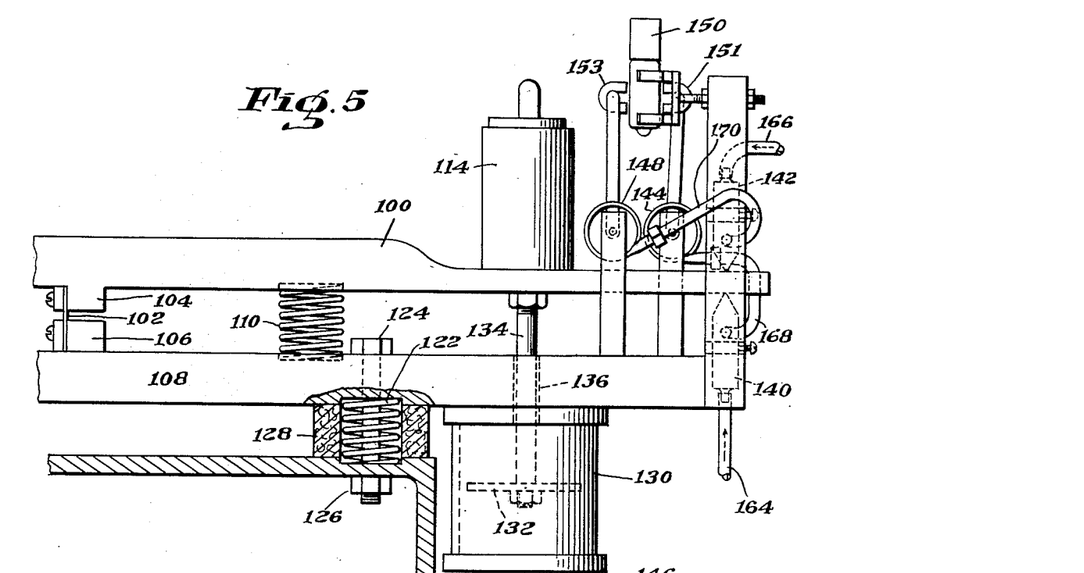
Figs. 5 and 6 are enlarged detail views in side elevation and plan respectively of the counterweight end of the scale beam and including the control mechanism shown in Fig. 4.
Figure 6:
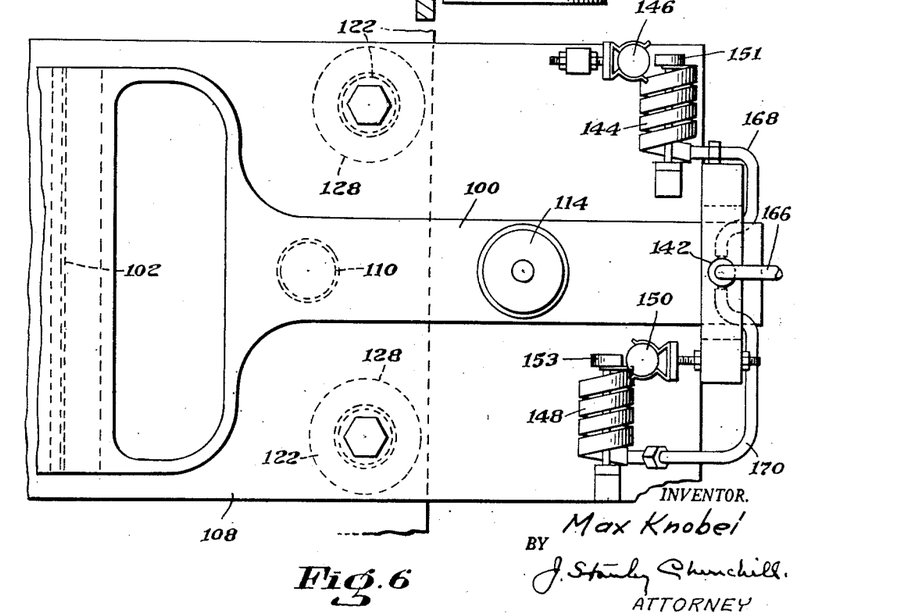

Referring now particularly to Figs. 5, 6 and 7, the control mechanism for reducing the flow of the material when a bulk weight is reached and for discontinuing the flow of material when a final weight is reached in response to minute movement of the scale beam, includes a pair of pneumatically operated conduit units 140, 142 arranged to cooperate with an extension of the counter-weight end of the scale beam 100. The lower unit 140 is connected to a pneumatically operated pressure responsive element, herein shown as a Bourdon tube 144 arranged to operate a magnetic switch 146, of known construction, forming a part of the circuit to the bulk gate solenoid 36, and the upper unit 142 is connected to a similar Bourdon tube 148 arranged to operate a magnetic switch 150 forming a part of the circuit to the drip gate solenoid 38, as illustrated in Fig. 8. One available form of magnetic switch comprises a pair of contacts sealed in a glass tube and having a pool of mercury at its lower end. One of the contacts is fixed in the mercury, the other being movable into and out of the mercury to close and open the circuit under the influence of magnets 151, 153 connected to and movable with its respective Bourdon tube 144, 148. The magnetic switches 146, 150 herein illustrated are of the normally open type and are arranged to be held in their closed position by their magnets 151, 153 when the latter are rocked into a vertical position, as indicated in Fig. 8.

As illustrated in Fig. 4, the counter-weight end of the scale beam 100 is extended between the upper and lower pneumatic control units 140, 142, the scale beam normally being in contact with the lower unit 140 to maintain a predetermined pressure in the Bourdon tube 144, as will be described, and to thus maintain the magnet 151 in its vertical position to maintain the magnetic switch 146 in its closed position. Thus, in operation, when the pressure is reduced in the Bourdon tube 144, upon minute upward movement of the scale beam from engagement with the lower unit 140, the magnet 151 is rocked away from its switch 146 to open the circuit to the solenoid 36 and effect closing of the gate 32.

After the bulk load gate has been closed in the manner above described, the drip stream continues to flow into the receptacle and the counter-weight end of the scale beam continues to move upwardly a minute distance until it arrives in a position spaced a minute distance from the discharge orifice of the upper unit 142. The upper unit 142 is normally open and the Bourdon tube 148 is arranged to maintain its magnet 153 in a vertical position under a reduced pressure so that when the counterweight end of the scale beam reaches the aforesaid position a minute distance from the discharge orifice of the upper unit 142, the pressure is increased in the Bourdon tube 148 in a manner to be described, and the magnet 153 is rocked away from its switch 150 to open the circuit to the solenoid 38 to effect closing of the drip load gate 34.

As illustrated in detail in Fig. 7, the pneumatic control units 140, 142 are similar in construction and mode of operation. Each comprises a conduit provided with a small discharge orifice 158 at its discharge end and with which the extended end of the counterweight end of the beam 100 cooperates to open and close the orifice 158. In the normal position of the beam during that portion of the operation of the machine in which the bulk stream is being delivered into the weighing receptacle 16, the extended end of the beam rests upon and closes the discharge orifice 158 of the unit 140. Each control unit is provided with a restricted throat 156 spaced from the discharge orifice 158 and connected by an intervening chamber 154. Air under pressure is supplied to each control unit by connection of a fitting 152′ with one of the pipes 164, 166 connected to a source of supply of compressed air through pipes 160, regulating valve 162 and pipe 160, as shown in Fig. 1. Each control unit is also provided with a fitting 154′ connected by flexible pipes 168, 170 to one end of the Bourdon tubes 144, 148. From a consideration of Fig. 7 it will be observed that air under a definite pressure, such for example as 50 lbs. per square inch, may be supplied to the entrance end of the control unit 140 and to the chamber 152 thereof, and because of the resistance offered by the throat 156, the pressure within the second chamber 154 and between the discharge orifice 158 and throat 156 will be sufficient to operate the Bourdon tube 144 to maintain the magnet 151 in a vertical position and thus maintain the magnetic switch 146 in its closed position. This occurs during the bulk weighing period of operation when the end of the beam obstructs the discharge orifice 158. Upon minute upward movement of the scale beam after the bulk weight has been reached, the opening of the discharge orifice 158, even as little as .001 of an inch, operates to substantially reduce pressure in the chamber 154 and consequently in the Bourdon tube thus rocking the magnet 151 away from its switch 146 and opening the circuit to the solenoid 36 to close the gate 32 as above described. As shown in Fig. 1 the upper pneumatic control unit 142 is inverted and arranged to operate its Bourdon tube in a manner just the reverse of the operation of the lower unit 140. The unit 140 is arranged so that during the bulk loading operation above described its discharge orifice 158 remains open and as a result the pressure within the Bourdon tube 148 is maintained at a lower value whereby the magnet 153 is maintained in vertical position. When the scale beam approaches the discharge orifice 158 of the unit 142, as above described, pressure is instantly increased within the chamber 154 of such unit and also within the Bourdon tube 148 to thereby immediately rock the magnet 153 from its switch 150 to open the circuit to the solenoid de-energizing the same and thus effecting closing of the drip stream gate 34 as above described.

In practice, the pneumatic control units may be adjusted relative to the spring-loaded and counter-weighted scale beam 18 so that the beam is normally down at the counter-weight end against the top of the unit 140, the upper or discharge end thereof serving as a stop for limiting the movement of the scale beam in this direction. As material is added to the weighing end of the beam, the latter will remain at rest until such time as the weight overcomes the counter-weight 114 and the preset spring tension of the spring-loaded scale beam. In the illustrated embodiment of the invention, for example, if the final weight to be obtained is 16 ounces, adjustments may be made so that the beam leaves or starts to move away from the lower control unit 140 without vibrating up and down when approximately 14 ounces has been introduced into the receptacle 16 to effect closing of the gate 32 to shut off the bulk stream feed. In the continued operation of the machine, the fine or drip stream feed continues, and the spring 110 on the left of the strip 102 is very slightly compressed while the other spring 110 correspondingly expands, and the beam moves gradually from its position at rest on the lower unit 140 until it approaches the inverted control unit 142, adjustments being made so that the unit 142 will effect closing of the gate 34 to entirely and rapidly shut off the feed of the material when the final weight of 16 ounces is reached.

As above described, the pneumatic control units are so constructed that a large pressure change occurs after a movement of the beam end through a minute distance, such as one thousandth of an inch and the deflection of the spring means is correspondingly small. Thus, in practice, the lower unit 140 may be adjusted relative to the scale beam so as to effect closing of the bulk load gate upon movement of the beam one thousandth of an inch and the upper unit 142 may be adjusted to effect closing of the drip load gate by movement of the beam during its last one thousandth of an inch as it nears the discharge orifice of the upper unit so that the total travel of the scale beam between the two units need be only a few thousandths of an inch, and in practice successful and efficient operation has been experienced with a total beam movement of from three to eight thousandths of an inch. The fast action thus obtained, as hereinafter explained in detail, greatly reduces the time required for completion of the weighing operation resulting in exceedingly accurate weights minimizing the effect of lack of uniformity of stream flow of the material being weighed.

In the actual operation of the machine there is no apparent delay in the rocking movement of the scale beam once it has started to move until both gates 32, 34 are closed through the control mechanisms described, so that, in practice, a continuous rocking movement of the scale beam through a minute distance effects closing of the bulk load gate and then the drip load gate in rapid succession in accordance with the weight of the material deposited into the receptacle by the continuously flowing stream, thus enabling the weighing operation to be performed rapidly without sacrificing accuracy. It will be apparent that the pneumatic control units 140, 142 are self-cleaning thus preventing dust or other foreign matter from accumulating in the orifice 158 or other passageways.

At the end of the final weighing operation provision is made for releasing the weighed loads in the receptacles to permit the material to fall by gravity through the funnel 20 and into the carton 22 placed therebeneath. As herein shown, the bottom of the receptacle comprises two shutters 172, 174 pivotally mounted on the receptacle and normally held in their abutting and closed position by springs 176, 178. The shutters are connected by toggle links 180, 182 provided with a roller 186 at their connected ends adapted to be engaged by an arm 188 to operate the toggle linkage to effect opening of the shutters. As illustrated in Fig. 1, the arm 188 is arranged to be operated through connections from a cam 190 fast upon a one revolution cam shaft 192 journaled in suitable bearings in the machine frame. A bell crank 194 pivotally mounted on a cross shaft 196 carries a roller 198 on one arm, the other arm being connected by a link 200 to a lever 202 clamped to a rocker shaft 204. The operating arm 188 is also fast upon the rocker shaft 204 so that through the connections described the receptacle is opened to deliver the weighed load to the carton disposed therebeneath.

Provision is also made at the end of the final weighing operation for resetting the parts into their original position in order to enable the scale to perform another weighing operation. As illustrated in Figs. 1 and 3, the armatures 50, 64 of the electro-magnets 36, 38 respectively, are arranged to be returned into operative engagement with their electro-magnets through connections from a cam 206 mounted fast upon the cam shaft 192. The cam 206 is arranged to cooperate with a roller 208 carried by a cam lever 210 pivotally mounted at 196 and the lever 210 is connected by a link 212 to an arm 214 clamped on a rocker shaft 215. The rocker shaft is provided with rocker arms 216, 218 fast thereon which are arranged to engage rollers 220, 222 carried by the arms 44, 58 respectively to rock the latter on their pivots 46, 60 to effect the resetting operation. It will also be observed that resetting of the arm 58 effects removal of the pawl 90 from its ratchet 78 to permit the drum 14 to be again rotated to feed the material. As previously described, the pawl 90 is brought into engagement with the ratchet 78 at the end of the drip weighing operation to discontinue the feed of material.

The cam shaft 192 may be rotated in any usual or preferred manner preferably through connections from the weighing machine driving mechanism in the manner illustrated and described in the Howard Patent No. 2,364,902. In practice, the cam shaft is controlled by a one revolution clutch, not shown, arranged to permit the cam shaft to make one revolution at the end of each weighing operation to effect release of the weighed load and to reset the filling and weighing mechanism as above described. It will be apparent that as soon as the weighed load of material is released from the receptacle 16, the spring-loaded scale beam 100 will quickly return to its normal or weighing position of its own accord, thus eliminating any scale resetting mechanism as formerly required.

In prior constructions of weighing machines embodying electrical contacts, relays, and circuits for operating the material feed control devices, a substantial time interval intervenes between the deposition of the predetermined weight of material on the scale beam and the time that the control devices are operated to cut off delivery of more material upon the scale beam. The amount of material added during this time is substantial and is usually referred to as the "added increment." Variations in the uniformity of the stream flow produce substantial variations in the weight of this "added increment," and it is the aim of the present invention to effect the operation of the control devices to cut off the material feed as quickly as possible after a predetermined weight has been deposited upon the scale beam. The reason for this is that in prior weighing machines the vibrations of the machine cause the counterweighted end of the beam to rise and fall, thereby repeatedly striking against its stop, at the time that the beam is almost balanced. Hence, the beam must be rocked a substantial distance after the load being weighed has overbalanced the counterweight before the effects of the machine vibrations are avoided. This means that the beam must be moved a considerable distance from the stop (with a corresponding time delay) before its movement can be utilized to actuate any kind of control for terminating the feed. It is during this interval of movement that variations in stream flow seriously affect the accuracy of the resulting load. This is apparent from the fact that movement of the beam is not controlled in any way at such time, but is rocking freely and is incapable, because of its inertia, to quickly change its position in phase with change in the rate of stream flow. Accordingly, it has been difficult heretofore to consistently weigh accurate loads with material that does not flow in a uniform stream. The present construction of weighing element involving the embodiment of stiff springs to load the beam leads to the production of an extremely small displacement of the beam, without vibrating up and down, when a given weight of material is added to the weighing end of the beam. This small displacement is produced in an extremely small time, and provision is made for actuating the control devices to cut off the material feed by the above described pneumatic control mechanism which is sensitive to this small motion. For example, with a control mechanism sensitive to a movement of the weighing end of the beam from one position to another of .001 of an inch or less, stiff springs can be used which will give a motion of the beam for example of .010 of an inch per ounce of increment added so that the velocity of the beam, and hence its momentum, will be kept at a very low level. Thus, if the feed rate is 1 ounce per second, the velocity of the beam would be only .010 of an inch per second. This low velocity is of great advantage when weighing materials which cannot be fed in a uniform stream as it means that when the feed rate varies by even as much as 100% the velocity of the beam would only have to change by the small amount of .010 of an inch per second, and because this change is so small, the time consumed in making this change is minute and, due to the spring support, the beam's velocity will always be in phase with the rate of deposit of material onto the weighing end of the beam.

The usual counterweighted knife-edge supported beam heretofore used, on the other hand, moves approximately .500 inch per ounce after the effect of the counterweight has been overcome. Hence the velocity of the beam for the one ounce per second feed rate will be .500 inch per second. When this feed rate is increased by 100% to a new feed rate of two ounces per second, the beam would have to be accelerated to the new velocity of 1.000 inch per second. This means a velocity of .500 of an inch per second, or approximately fifty times as great a velocity change for the same feed rate as required by the beam of this invention. Manifestly, it takes the new feed rate much longer to accelerate a beam by an amount of .500 of an inch per second than to accelerate it by only .010 of an inch per second and, hence, weighing machines embodying conventional beams which have such higher deflection rates are not rapidly responsive to changes in stream rate, as is the present weighing machine. It is preferred to damp the vibrations of the resonant system, preferably to a degree substantially that of so-called critical damping in which the beam deflects from its initial to its final position with substantially no additional oscillations. With this amount of damping the time required for the beam to deflect from one position to the other approximates the time of one oscillation of the beam and with the stiff spring loaded beam the natural frequency varies from five to fifteen oscillations per second and is preferably of the order of ten oscillations per second, so that the time required for completing the minute movement of the scale beam varies from one-fifth to one-fifteenth of a second or less, and is preferably about one-tenth of a second.

It will also be observed that utilizing the pneumatic control units for cutting off the bulk and drip streams when the control operates, the scale beam is free, having opened the lower orifice to cut off the bulk stream and subsequently move to near the upper orifice to cut off the drip stream, and as a result the material feed controls are operated immediately after the beam has been moved by the addition of the predetermined weights to the weighing end of the beam.

While as herein shown the scale beam utilizes a flexible fulcrum comprising a strip of thin spring steel 102, it will be understood that an inverted knife edge suspension can be used if found desirable.

While as above described the weighing operation is completed in an extremely rapid manner, due to the fast action of the spring loaded beam, nevertheless it is appreciated that a small amount of time is also consumed by the flow of air into and from the pneumatic control mechanism when the described increase or drop in air pressure is being effected within the control unit, and accordingly in practice it is advisable that the size of the control units be designed so that the volume of air thus required to flow into and from the pneumatic control units is as small as practicable.

While the present machine has been described with particular reference to its utility in accurately and quickly weighing loads fed by a stream whose rate may vary, it is to be understood that the principles thereof are not limited to variable stream feed, but that these principles are also applicable to rapid and high speed weighing with a uniform stream.

While the preferred embodiment of the invention has been herein illustrated and described, it will be understood that the invention may be embodied in other forms within the scope of the following claims.

Having thus described the invention, what is claimed is:

1. In a weighing machine, in combination: a movable load receiving member; preloaded stiff spring means supporting the receiving member and controlling the movement thereof; said supporting spring means having a deflection value lying between the limits of .030 and .002 of an inch of deflection of the load receiving means when a test weight of one ounce in excess of the preloading is placed on the load receiving member; damping means connected with said spring means for damping the vibrations thereof, said spring means and damping means offering such resistance to the movement of the load receiving member as to cause the successive positions of the load receiving member during at least the last part of the weighing operation to essentially correspond to the weight of the load thereon; material feeding means for feeding material in a stream onto the load receiving member; means for interrupting the feeding of the material; and sensitive control means responsive to an increment in the movement of the load receiving member not exceeding .001 of an inch to actuate the feed interrupting means at a predetermined position of the load receiving member corresponding to a predetermined weight of load.

2. In a weighing machine as defined in claim 1, in which the sensitive control means is free from engagement with the load receiving member at the time of interruption of the material feeding means.

3. A weighing machine as defined in claim 1, in which the stiff spring means has a natural frequency of vibration of the order of five to fifteen cycles per second.

4. A weighing machine as defined in claim 1, wherein the damping means limits the deflection of the load receiving member from its initial position to its final position during the weighing operation to a single oscillation.

5. A weighing machine as defined in claim 1, in which the sensitive control means comprises a pneumatic control device has a discharge orifice, a relatively restricted throat portion spaced in advance of the discharge orifice for offering a substantial resistance to the flow of air therethrough, and in which the load receiving member is movable in the direction of the flow of air from the discharge orifice and serves as a closure for the orifice to vary the pressure in the control means between said orifice and restricted throat portion, and means responsive to said variations in pressure for actuating the feed interrupting means.

6. In a weighing machine, in combination: a movable load receiving member; preloaded stiff spring means supporting the load receiving member and controlling the movement thereof, said supporting spring means having a deflection value lying between the limits of .010 and .002 of an inch of deflection of the load receiving member when a test weight of one ounce in excess of the preloading is placed on the load receiving member; damping means connected with the load receiving member for damping the vibrations thereof, said spring means and damping means offering such resistance to the movement of the load receiving member as to cause the successive positions of the load receiving member at least during the last part of the weighing operation to essentially correspond to the weight of the load thereon; material feeding means for feeding material in a stream onto the load receiving member; means for interrupting the feeding of the material; and sensitive control means responsive to an increment in the movement of the load receiving member not exceeding .001 of an inch to actuate the feed interrupting means at a predetermined position of the load receiving member corresponding to a predetermined weight of load.

7. In a weighing machine, in combination, a movable weighing element for weighing a predetermined load of material, material feeding means for feeding flowable solid material in a stream onto the receiving part of the weighing element; stiff spring means opposing the movement of said weighing element, the stiffness of said spring means being correlated to the combined weight of said movable weighing element and the load to be weighed so that movement of the receiving part of the weighing element through a distance of a few thousandths of an inch occurs in a fraction of a second as the load of the material on the weighing element is reaching the predetermined weight; and control means responsive to the minute movement of the receiving part of the weighing element for terminating the feed of the material onto the weighing element.

8. In a weighing machine, in combination, a weighing member for receiving a load; material feeding means for feeding flowable solid material in a stream onto the receiving end of the weighing member; spring means for resisting the movement of the weighing member as the load is being applied thereto, the movement of the weighing member during at least the last portion of the application of the load thereto being such that the weighing member assumes positions corresponding to the applied load, the stiffness of the springs being correlated to the combined weight of the weighing member and the load to be weighed, so that during the period that the last portion of the load is being applied, the receiving end of the weighing member is moved through a minute distance not exceeding a few thousandths of an inch in a fraction of a second; and control means responsive to the movement of said weighing member for terminating the operation of the material feeding means.

9. In a weighing machine, in combination: a movable load receiving member; stiff spring means supporting the receiving member and controlling the movement thereof; damping means connected with said spring means for damping the vibrations thereof, said spring means and damping means offering such resistance to the movement of the load receiving member as to cause the successive positions of the load receiving member during at least the last part of the weighing operation to essentially correspond to the weight of the load thereon; material feeding means for feeding material in a stream onto the load receiving member; means for interrupting the stream feeding of the material; and sensitive control means responsive to a movement of the load receiving member of the order of about .001 of an inch to actuate the feed interrupting means to cut off stream feed at a predetermined position of the load receiving member corresponding to a predetermined weight of load, said stiffness of the spring means and the weight of the load receiving member together with the weight of the load being weighed forming at the time of stream feed cut-off, a resonant system having a natural frequency of vibration of the order of from 5 to 15 cycles per second, whereby rapid and accurate weighing can be obtained notwithstanding any substantial variations that may occur in the rate of the feed of the stream.

10. In a weighing machine, in combination, a movable weighing element for weighing a predetermined load of material, material feeding means for feeding flowable solid material in a stream onto the load receiving part of the weighing element; stiff spring means opposing the movement of said weighing element, the stiffness of said spring means being correlated to the combined weight of said movable weighing element and the load to be weighed so that movement of the load receiving part of the weighing element through a minute distance not exceeding a few thousandths of an inch occurs in about 1/15 to 1/5 of a second as the load of the material on the weighing element is reaching the predetermined weight; and highly sensitive control means responsive to said minute movement of the load receiving part of the weighing element for terminating the feed of the material onto the weighing element, said spring means and load receiving member together with the load being weighed forming at the time of stream feed cut-off, a resonant system having a natural frequency of vibration of the order of from 5 to 15 cycles per second.

11. A weighing machine as defined in claim 9, in which the sensitive control means comprises a conduit through which air under pressure may flow, said conduit having a reduced discharge orifice and a restricted throat portion spaced in advance of the discharge orifice offering resistance to the flow of air therethrough, a movable valve member actuated by movement of the load receiving member to effect variation in the air pressure in the conduit between it and said throat; and mechanism actuated in response to such pressure variation for initiating the opertion of the stream interrupting means.

12. A weighing machine as defined in claim 9, in which the sensitive control means comprises a conduit through which air under pressure may flow, said conduit having a reduced discharge orifice and a restricted throat portion spaced in advance of the discharge orifice offering resistance to the flow of air therethrough, a movable valve member actuated by movement of the load receiving member in a direction longitudinally of the flow of air being discharged from said discharge orifice to effect variation in the air pressure in the conduit between it and said throat; and mechanism actuated in response to such pressure variation for initiating the operation of the stream interrupting means.

13. In a weighing machine, in combination, a spring-loaded weighing element having a natural frequency of vibration between 5 and 15 cycles per second, means for feeding flowable solid material in a stream to the load-receiving end of said weighing element, means for interrupting said feeding, control means, and connections between said control means and said feed-interrupting means, said control means being operative to actuate the feed-interrupting means in response to minute movement of the weighing element through a distance not exceeding .001 of an inch, whereby rapid accurate weighing may be obtained notwithstanding any substantial variations that may occur in the rate of feed of the stream of the material being weighed.

14. In a weighing machine, in combination: a movable load receiving member; stiff spring means supporting the receiving member and controlling the movement thereof; damping means connected with said spring means for damping the vibrations thereof, said spring means and damping means offering such resistance to the movement of the load receiving member as to cause the successive positions of the load receiving member during at least the last part of the weighing operation to essentially correspond to the weight of the load thereon; material feeding means for feeding material in a stream onto the load receiving member; means for interrupting the stream feeding of the material; and sensitive control means responsive to a predetermined movement of the load receiving member to actuate the feed interrupting means to cut off stream feed at a predetermined position of the load receiving member corresponding to a predetermined weight of load, said stiffness of the spring means and the weight of the load receiving member together with the weight of the load being weighed forming at the time of stream feed cut-off, a resonant system having a natural frequency of vibration of the order from 5 to 15 cycles per second, whereby rapid and accurate weighing can be obtained notwithstanding any substantial variations that may occur in the rate of the feed of the stream.

15. A weighing machine as defined in claim 14, in which the sensitive control means comprises conduit means having a first portion through which air under pressure may flow, said conduit means having a second portion providing a restricted flow of air therethrough and having an outlet, and a relatively restricted throat portion limiting flow through said second portion, a movable valve member actuated by movement of the load receiving member controlling the flow from said outlet to effect variation in the air pressure in the second portion of the conduit means between the outlet and said throat; and mechanism actuated in response to such pressure variation for initiating the operation of the stream interrupting means.

16. A weighing machine as defined in claim 1, in which the sensitive control means comprising the pneumatic control device, has a discharge orifice, a relatively restricted throat portion spaced in advance of the discharge orifice for offering a substantial resistance to the flow of air therethrough, and in which the load receiving member is movable along the path of the flow of air from the discharge orifice and serves as a valve member controlling the flow from said orifice to vary the pressure in the control means between said orifice and restricted throat portion, and means responsive to said variations in pressure for actuating the feed interrupting means.

MAX KNOBEL.

REFERENCES CITED

The following references are of record in the file of this patent:

UNITED STATES PATENTS

| Number | Name | Date |
|---|---|---|
| 1,659,389 | Cameron | Feb. 14, 1928 |
| 1,702,741 | Mojonnier | Feb. 19, 1929 |
| 1,893,622 | Howard | Jan. 10, 1933 |
| 2,033,586 | Noble | Mar. 10, 1936 |
| 2,077,525 | Mennesson | Apr. 20, 1937 |
| 2,207,885 | Howard | July 16, 1940 |
| 2,212,085 | Tate | Aug. 20, 1940 |
| 2,212,419 | Harmon | Aug. 20, 1940 |
| 2,224,812 | Flanagan | Dec. 10, 1940 |
| 2,264,562 | Bryant et al. | Dec. 2, 1941 |
| 2,295,399 | Hanna | Sept. 8, 1942 |
| 2,364,902 | Howard | Dec. 12, 1944 |

FOREIGN PATENTS

| Number | Country | Date |
|---|---|---|
| 659,851 | Germany | 1938 |